Sept. 11, 1951        I. MYER        2,567,343
ROW CULTIVATOR
Filed Nov. 4, 1949        2 Sheets—Sheet 1
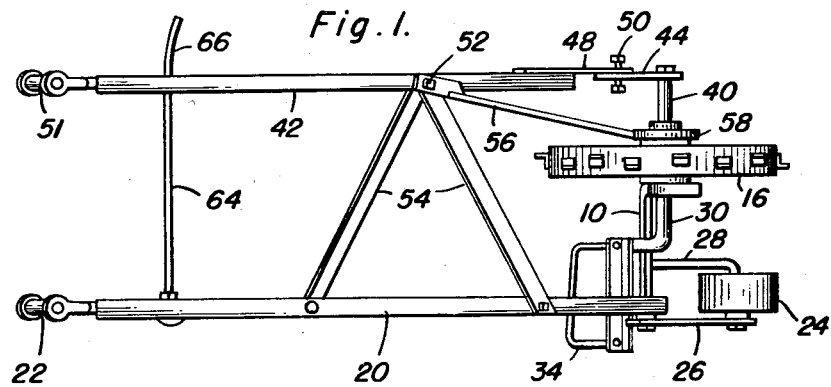
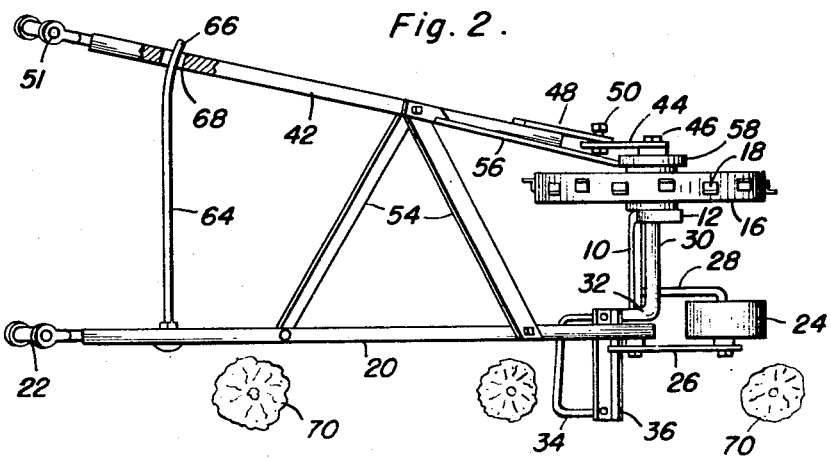
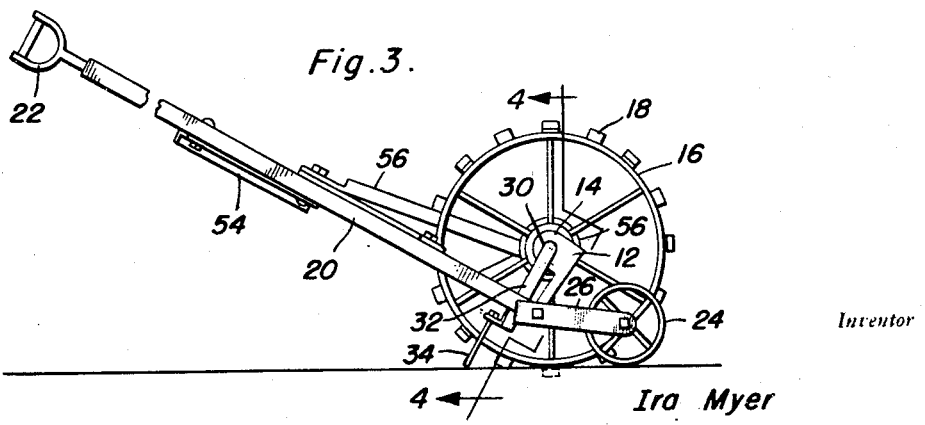
Inventor
Ira Myer Sept. 11, 1951        I. MYER        2,567,343
ROW CULTIVATOR
Filed Nov. 4, 1949        2 Sheets-Sheet 2
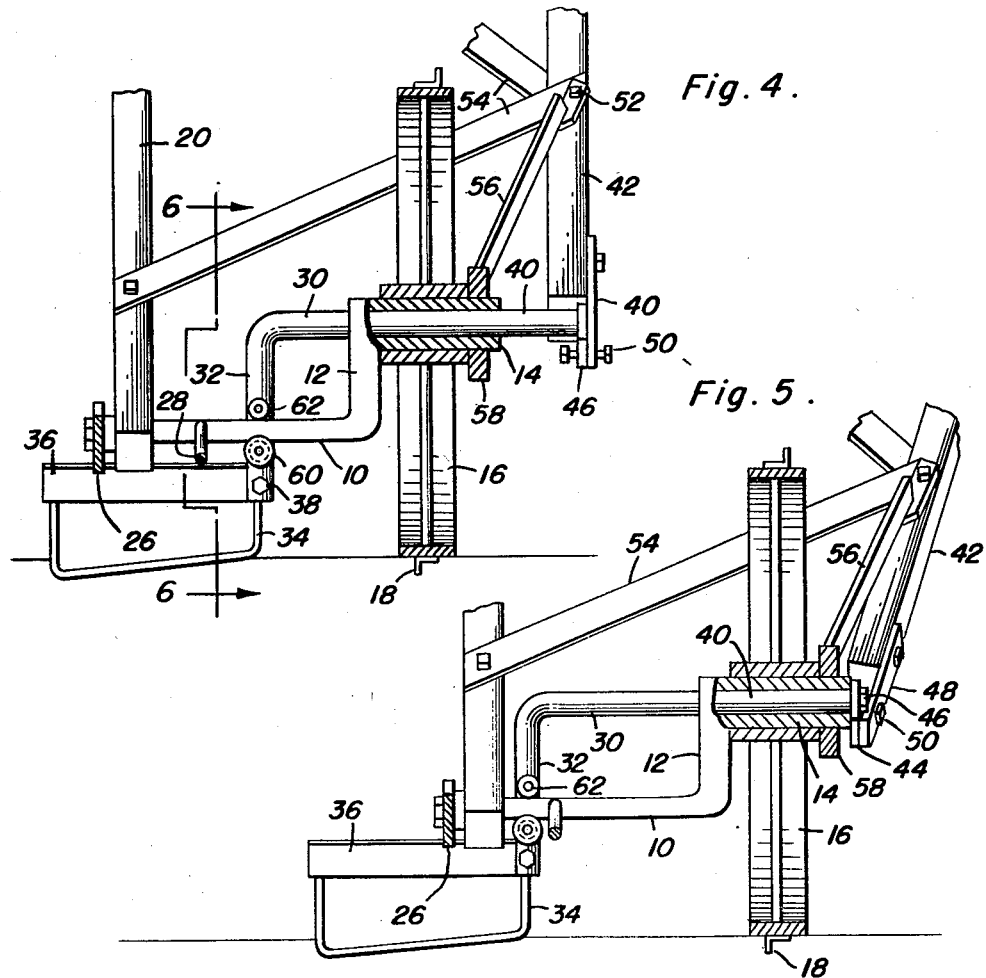
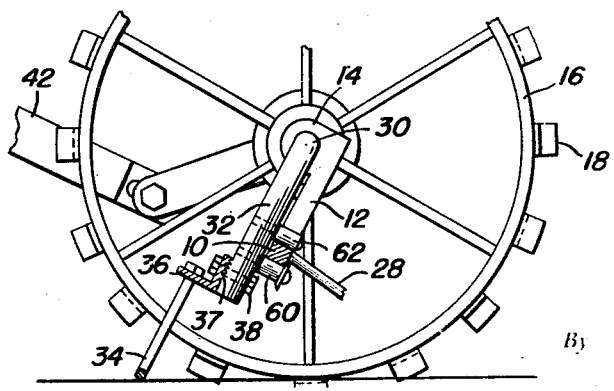
Inventor
Ira Myer Patented Sept. 11, 1951

2,567,343

UNITED STATES PATENT OFFICE 2,567,343

ROW CULTIVATOR

Ira Myer, Ephrata, Pa.

Application November 4, 1949, Serial No. 125,408

2 Claims. (Cl. 97—59)

This invention relates generally to a cultivator, more particularly to a cultivator designed especially for row crops.

A primary object of this invention is to provide a cultivator in which the ground tool can be moved transversely of the machine as the machine is propelled forwardly along a row, thus allowing for cultivation of row crops in which the plants are spaced apart a considerable distance.

Another object of this invention is to provide a machine which may be used for thinning row crops.

Still another object of this invention is to provide a row crop cultivator in which a guide wheel is rotatably mounted on a frame portion of the machine so that this guide wheel cannot move transversely of the machine, and the guide wheel is provided with ground-contacting spikes to prevent side slippage of the guide wheel, whereby the machine is easily preserved from moving bodily transversely of the rows when the ground tool is thus moved.

A last object to be mentioned specifically is to provide a row cultivator which is practicable and inexpensive to manufacture, which is simple, safe and convenient to use, which is adjustable for use with many types of row crops, and which will give generally efficient and durable service.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this application, and in which:

Figure 1 is a top plan view of the assembled machine;

Figure 2 is another top plan view of the assembled machine showing the pivoted handle in a second position, as when the ground tool is moved to the right between plants for the cultivation of the ground between the plants, or, alternatively, in the actual thinning operation of row crops;

Figure 3 is a side elevational view of the assembled machine;

Figure 4 is a vertical sectional view, taken substantially upon line 4—4 in Figure 3;

Figure 5 is a vertical sectional view, similar to Figure 4 and showing the pivoted lever, ground tool, and associated parts in a second position, corresponding to the position thereof indicated in Figure 2; and Figure 6 is a vertical transverse sectional view taken substantially upon the line 6—6 in Figure 4.

Similar characters of reference designate similar or identical elements and portions throughout the specification and throughout the different views in the drawings.

Referring now to the drawings in detail, this row crop cultivator includes a transverse frame member 10 having a portion 12 bent upwardly and carrying a hollow journal 14 upon which is mounted a guide wheel 16 having ground-piercing spikes 18 comprised of short lengths of angle iron secured to the rim portion of the guide wheel. A fixed handle 20 is rigidly secured at its lower end to one end of said frame member, this handle extending upwardly and rearwardly of the machine and terminating in a hand grip member 22. A stabilizing wheel 24 is mounted upon the same end portion of the frame 10 by means of parallel arms 26 and 28, to prevent undue tilting of the cultivator during use, the arm 26 being secured to the lower end of the fixed handle 20 and the arm 28 being secured to an intermediate portion of the frame member 10.

A ground tool carrying bar 30 extends transversely of the machine and has a depending portion 32 upon which a ground tool 34 is rigidly secured. The character of the ground tool 34 is important in this application for patent inasmuch as the ground tool is designed for transverse movement with the greatest possible facility without removal from the ground. The ground tool has a looped lower portion designed to penetrate the soil, and this subsoil portion operates without greatly disturbing the top layer of soil even when the tool is shifted transversely of the machine. One end of the looped lower portion may depend below the other end, and the tool has an upper cross-bar portion 36 which will ordinarily include attaching means, preferably of serrated nut character, as indicated at 37 in Figure 6, to facilitate the adjustable securement of the tool on the end of the depending portion 32 of the bar, as by means of the attaching bolt 38.

The other end of the bar 30 is journaled, as indicated at 40, in the hollow journal 14 and is secured to the pivoted handle 42, hereinafter described more fully, by means of a pivotal connection comprising a strap 44 secured to the end of the journal 40 by means of a bolt 46 or the like, a strap 48 secured to the lower end of the pivoted handle 42 and a pivot pin 50 securing the members 44 and 48 together, the strap 48 being slotted and the pin 50 being of sufficient length to allow pivotal action as required. The pivoted handle 42 extends upwardly and rearwardly of the machine, substantially parallel to the fixed handle 20 and a hand grip 51 is provided on the upper end of the pivoted handle, while the actual pivot connection comprises a pin 52 and a pair of rigid brace members 54 secured to the fixed handle 20. It should be noted that an auxiliary brace member 56 is rigidly secured to the aforementioned brace structure and this auxiliary brace 56 carries a bearing member 58 which holds the guide wheel 16 on the hollow journal 14, the hub of the guide wheel 16 being disposed between the upstanding portion 12 of the frame 10 and this bearing member 58.

Anti-friction means for the bar 30 as it slides transversely of the machine on frame 10 is provided, the means illustrated in the drawings comprising a lower and an upper roller bearing 60 and 62, respectively, mounted on the depending portion 32 of the bar 30, the frame 10 being slidably mounted between these roller bearings.

A handle guide member 64 is rigidly secured at one end to the fixed handle 20 and extends transversely of the machine toward the pivoted handle 42, this member having an arcuate portion 66 adapted dimensionally and positionally to slide within a slot 68 in the pivoted handle 42 as this handle is shifted during the operation of the machine.

The operation of this invention will be clearly understood from a consideration of the foregoing description of the mechanical details thereof, taken in connection with the drawings and the above recited objects of the invention. In recapitulation, it may be noted that when row crops, illustrated in Figure 2 by the plants 70, are being cultivated, the pivoted handle 42 is moved to the right and left in order to move the bar 30 and the ground tool 34 into the spaces between the plants 70, the handle being shifted to the position indicated in Figure 1 in order to retract the ground tool 34 to the left and to avoid the plants 70 as the machine is propelled forwardly by hand. Obviously, power means might be incorporated with this machine, both to propel the machine along the row and to operate the pivoted handle 42. It should be carefully noted that the stabilizing wheel 24 is used to gauge the depth of the ground tool 34, while the guide wheel 16 with its ground-piercing spikes 18, prevents the machine from moving transversely when the pivoted handle is moved. Due to the comparatively simple nature of this invention, and the somewhat detailed foregoing description, further particularization of the invention would appear to be unnecessary.

While in the foregoing there has been shown and described the preferred embodiment of this invention, its is to be understood that minor changes in the details of construction, combination and arrangement of parts may be resorted to without departing from the spirit and scope of the invention as claimed.

Having described the invention, what is claimed as new is:

1. A row crop cultivator comprising a transverse frame member, a guide wheel freely rotatively mounted on said frame member, a fixed handle rigidly secured to one end of said frame member and extending upwardly and rearwardly of the cultivator, a stabilizing wheel adjustably secured to said one end of the frame member, a bar transversely slidably mounted in said frame member, a ground tool mounted on said bar adjacent to said stabilizing wheel, said frame and fixed handle having brace structure mounted thereon, a handle pivotally mounted on the brace structure and pivotally connected to said slidably mounted bar, said bar having a portion extending through the axle portion of said guide wheel for said pivotal connection with the pivoted handle.

2. A row crop cultivator comprising a transverse frame member, a guide wheel freely rotatively mounted on said frame member, a fixed handle rigidly secured to one end of said frame member and extending upwardly and rearwardly of the cultivator, a stabilizing wheel adjustably secured to said one end of the frame member, a bar transversely slidably mounted in said frame member, a ground tool mounted on said bar adjacent to said stabilizing wheel, said frame and fixed handle having brace structure mounted thereon, a handle pivotally mounted on the brace structure and pivotally connected to said slidably mounted bar, said bar having a portion extending through the axle portion of said guide wheel for said pivotal connection with the pivoted handle, and said frame member having anti-friction support means for the end portion of said bar remote from said guide wheel.

IRA MYER.

REFERENCES CITED

The following references are of record in the file of this patent:

UNITED STATES PATENTS

| Number | Name | Date |
|---|---|---|
| 482,919 | Gedeohn | Sept. 30, 1892 |
| 1,360,014 | Onstott | Nov. 23, 1920 |
| 2,015,587 | Bready | Sept. 24, 1935 |